United States Patent
Cho

(10) Patent No.: US 10,416,907 B2
(45) Date of Patent: Sep. 17, 2019

(54) STORAGE SYSTEM, STORAGE CONTROL APPARATUS, AND METHOD OF CONTROLLING A STORAGE DEVICE

(71) Applicant: FUJITSU LIMITED, Kawasaki-shi, Kanagawa (JP)

(72) Inventor: Emi Cho, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 15/622,642

(22) Filed: Jun. 14, 2017

(65) Prior Publication Data

US 2018/0052625 A1 Feb. 22, 2018

(30) Foreign Application Priority Data

Aug. 22, 2016 (JP) .................................. 2016-162270

(51) Int. Cl.
*G06F 3/00* (2006.01)
*G06F 3/06* (2006.01)
*G06F 12/02* (2006.01)

(52) U.S. Cl.
CPC ............ *G06F 3/0619* (2013.01); *G06F 3/064* (2013.01); *G06F 3/065* (2013.01); *G06F 3/0614* (2013.01); *G06F 3/0659* (2013.01); *G06F 3/0679* (2013.01); *G06F 12/0246* (2013.01); *G06F 12/0253* (2013.01); *G06F 3/0652* (2013.01); *G06F 2212/1032* (2013.01); *G06F 2212/1044* (2013.01); *G06F 2212/7201* (2013.01); *G06F 2212/7205* (2013.01)

(58) Field of Classification Search
CPC .. G06F 3/0619; G06F 12/0246; G06F 3/0614; G06F 3/0659; G06F 3/0679; G06F 3/064; G06F 12/0253; G06F 3/065; G06F 2212/7201; G06F 2212/7205; G06F 3/0652

See application file for complete search history.

(56) References Cited

U.S. PATENT DOCUMENTS

| 2014/0082276 | A1 | 3/2014 | Suzuki et al. | |
|---|---|---|---|---|
| 2015/0026390 | A1* | 1/2015 | Li | G06F 12/0246 711/103 |
| 2016/0321171 | A1* | 11/2016 | Kanno | G06F 12/0246 |
| 2017/0177235 | A1* | 6/2017 | Nishikubo | G06F 3/0659 |

FOREIGN PATENT DOCUMENTS

| JP | 7-234763 | 9/1995 |
|---|---|---|
| JP | 2014-59850 | 4/2014 |

* cited by examiner

*Primary Examiner* — Francisco A Grullon
(74) *Attorney, Agent, or Firm* — Staas & Halsey LLP

(57) ABSTRACT

A storage system includes a storage device including a first memory area and a second memory area, and a storage control apparatus configured to receive a first command requesting write of first data, cause the storage device to store the first data in the first memory area based on the first command, determine whether to cause the storage device to execute garbage collection on the first memory area based on a data amount of the first data, transmit a first instruction that instructs the storage device to execute the garbage collection on the first memory area, and cause the storage device to store second data in the second memory area when the garbage collection on the first memory area is being executed based on the first instruction and the processor receives a second command requesting write of the second data.

20 Claims, 13 Drawing Sheets

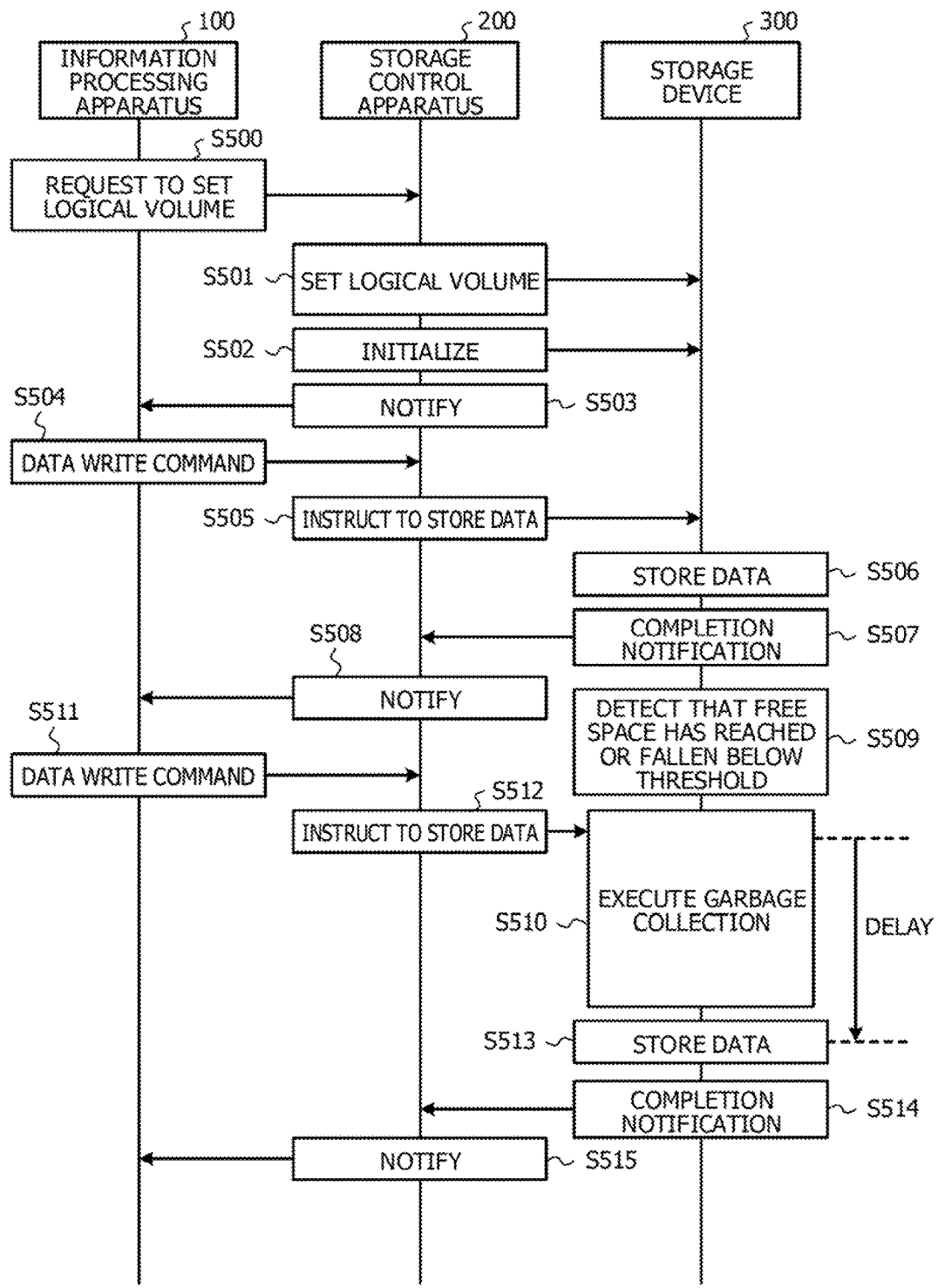

FIG. 10

| RECEIVED-COMMAND NUMBER | DATA-WRITE-COMMAND FLAG | LOGICAL ADDRESS | DATA AMOUNT | RANDOM FLAG |
|---|---|---|---|---|
| 1 | 1 | 0x0000_0000 | 0x400 | 0 |
| 2 | 0 | 0x0000_0400 | 0x200 | - |
| 3 | 1 | 0x0001_B000 | 0x100 | 1 |
| 4 | 1 | 0x0001_B100 | 0x300 | 0 |
| ⋮ | ⋮ | ⋮ | ⋮ | ⋮ |

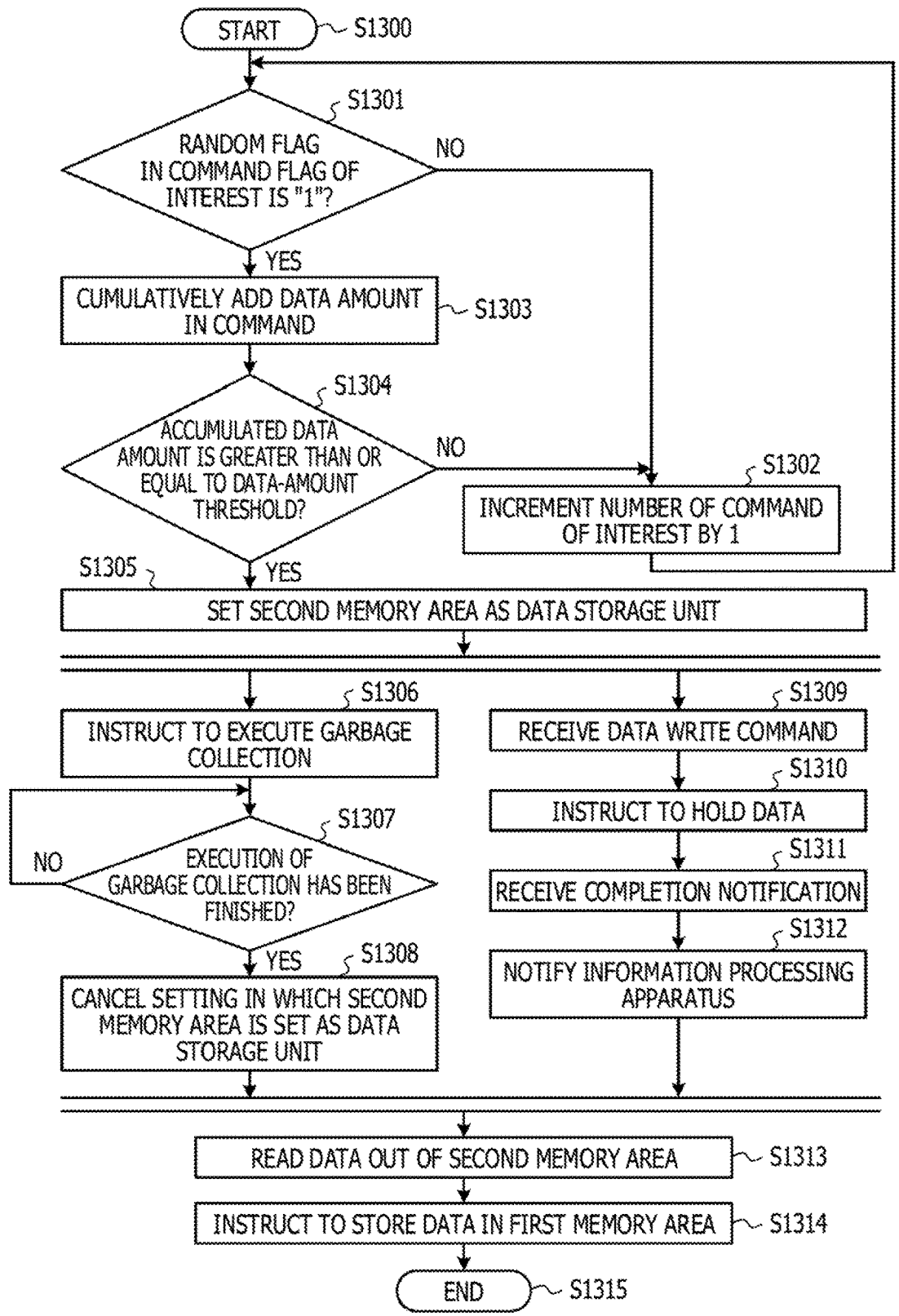

STORAGE SYSTEM, STORAGE CONTROL APPARATUS, AND METHOD OF CONTROLLING A STORAGE DEVICE

CROSS-REFERENCE TO RELATED APPLICATION(S)

This application is based upon and claims the benefit of priority of the prior Japanese Patent Application No. 2016-162270, filed on Aug. 22, 2016, the entire contents of which are incorporated herein by reference.

FIELD

The embodiment discussed herein is related to a storage system, a storage control apparatus, and a method of controlling a storage device.

BACKGROUND

In recent years, storage systems utilize solid state drives (SSD) as storage devices for storing data. An SSD includes a flash memory, which is a non-volatile memory, as a data storage unit and is superior to hard disk drives (HDD) in terms of the performance of random access to stored data and the like.

A flash memory includes a plurality of blocks as data storage areas, and each block further includes a plurality of pages. Write of data to a flash memory and read of data from a flash memory are executed on a page basis. Note that in flash memories, a page to which data is already written is not overwritable with other data. Thus, storing new data into a page in which data is already stored involves erasing the data in the page and then storing the new data.

Also, erasure of data stored in a flash memory is performed only on a block basis. For example, in a case where valid data is stored in a first page included in a first block and unrequested data is stored in a second page included in the first block, it is impossible to selectively erase only the unrequested data stored in the second page. Then, if the free space in the flash memory is low due to the unrequested data, the unrequested data may be erased to obtain a sufficient empty space by backing up the valid data stored in the first page to a second block and then erasing the data in the entire first block.

Also, in a case where an information processing apparatus such as a host server writes pieces of data with discontinuous logical addresses to an SSD, the pieces of data are stored scatteredly in the SSD, which may causes a decrease in free space. For this situation, garbage collection has been known as a process to increase the free space. Garbage collection generally starts to be executed when the SSD detects that the free space in its memory has reached or fallen below a predetermined value. Note that the "free space" in this specification is a value obtained by subtracting a logical capacity which is a capacity available for information processing apparatuses such as host servers from the physical capacity of the SSD, and corresponds to the capacity of an area called spare area. In execution of garbage collection, a process such as temporary back up of data is performed using the spare area. The related techniques are disclosed in, for example, Japanese Laid-open Patent Publication Nos. 2014-059850 and 7-234763 are related art documents.

SUMMARY

According to an aspect of the invention, a storage system includes a storage device including a first memory area and a second memory area and configured to determine whether to execute garbage collection on the first memory area based on a free space in the first memory area, and a storage control apparatus coupled to the storage device, the storage control apparatus including a memory and a processor coupled to the memory, wherein the processor is configured to receive a first command requesting write of first data, cause the storage device to store the first data in the first memory area, based on the first command, determine whether to cause the storage device to execute the garbage collection on the first memory area, based on a data amount of the first data, transmit a first instruction that instructs the storage device to execute the garbage collection on the first memory area when the processor determines to cause the storage device to execute the garbage collection based on the data amount of the first data, and cause the storage device to store second data in the second memory area when the garbage collection on the first memory area is being executed based on the first instruction and the processor receives a second command requesting write of the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram of processes for data storage and garbage collection in a comparative example;

FIG. 10 is an example of a command table in the embodiment;

FIG. 12 is a flowchart of a process mainly for instruction for garbage collection among the processes to be executed by the CPU in the embodiment.

DESCRIPTION OF EMBODIMENT

Data is not to be written to a flash memory on which garbage collection is being executed. Thus, in a case where a data write request is issued from an external information processing apparatus, for example, a host server capable of accessing the storage device, during execution of garbage collection, the write request has to wait until the execution of the garbage collection is completed. Then, after the execution of the garbage collection is completed, the data write based on the write request is executed on the flash memory. This consequently lowers the speed of response from the SSD to the host server.

Figure 1:
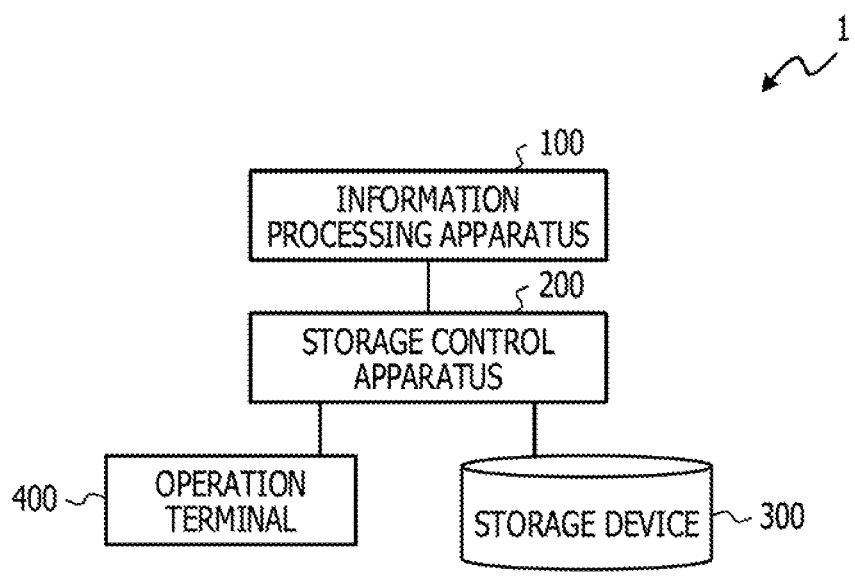
FIG. 1 is a block diagram of a system including an information processing apparatus, a storage control apparatus, a storage device, and an operation terminal.

FIG. 1 is a block diagram of a system 1 including an information processing apparatus 100, a storage control apparatus 200, a storage device 300, and an operation terminal 400. The information processing apparatus 100 is, for example, a host server, and stores data in the storage device 300 and reads data out of the storage device 300 as appropriate. The storage control apparatus 200 is, for example, a control module (CM) that configured to control the storage device 300. The storage device 300 is a data storage device configured to store data and is, for example, an SSD. The operation terminal 400 is an apparatus configured to operate the storage control apparatus 200 and is, for example, a personal computer (PC) coupled to the storage control apparatus 200.

To store data in the storage device 300, the information processing apparatus 100 transmits the data and a data write command to the storage control apparatus 200. Based on the data and the data write command received from the information processing apparatus 100, the storage control apparatus 200 instructs the storage device 300 to store the data. The storage device 300 stores the data received from the storage control apparatus 200 in a data storage unit, for example, a flash memory included in the storage device 300.

Also, after storing the data in the flash memory, the storage device 300 transmits a completion notification indicating that the storage of the data has been completed to the storage control apparatus 200. Based on the completion notification received from the storage device 300, the storage control apparatus 200 notifies the information processing apparatus 100 that the write of the data has been completed. In this specification, the time from when the storage control apparatus 200 instructs the storage device 300 to store data to when the storage control apparatus 200 receives a completion notification for the storage of the data from the storage device 300 is defined as the response time to a data write command. Note that one information processing apparatus 100 and one storage device 300 are coupled to the storage control apparatus 200 in FIG. 1, but a plurality of information processing apparatuses 100 and a plurality of storage devices 300 may be coupled to the storage control apparatus 200. Further, the plurality of storage devices 300 may be grouped as redundant arrays of inexpensive disks (RAID).

Figure 2:
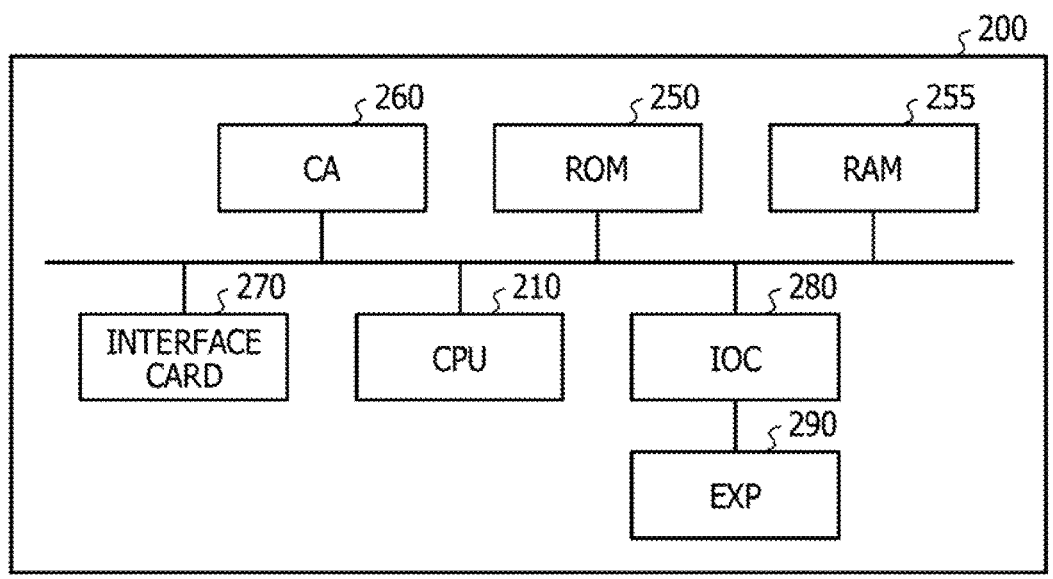
FIG. 2 is a diagram illustrating the hardware of the storage control apparatus.

FIG. 2 is a diagram illustrating the hardware of the storage control apparatus 200. The storage control apparatus 200 includes a central processing unit (CPU) 210, a read only memory (ROM) 250, a random access memory (RAM) 255, a channel adaptor (CA) 260, an interface card 270, an input output controller (IOC) 280, and an expander (EXP) 290. The CPU 210 performs predetermined data processing by loading a computer program stored in the ROM 250 to the RAM 255 and executing it. The CPU 210 is an example of a hardware processor. A micro control unit (MCU), a micro processing unit (MPU), a digital signal processor (DSP), a field programmable gate array (FPGA), or the like may be used instead of the CPU 210.

The ROM 250 stores the computer program to be executed by the CPU 210 and the like. The ROM 250 is an example of a non-volatile memory device, and a mask read only memory (mask ROM), a programmable read only memory (PROM), a flash memory, a magnetoresistive random access memory (MRAM), a resistance random access memory (ReRAM), a ferroelectric random access memory (FeRAM), or the like may be used. The RAM 255 is configured such that the computer program stored in the ROM 250 is loaded thereto. Also, the RAM 255 holds data to be processed by the CPU 210. The RAM 255 is an example of a volatile memory device, and a static random access memory (SRAM), a dynamic random access memory (DRAM), or the like may be used. The CA 260 functions as an interface to the information processing apparatus 100. The interface card 270 functions as an interface to the operation terminal 400. The IOC 280 controls data exchange performed between the information processing apparatus 100 and the storage device 300. The EXP 290 relays data exchange performed between the information processing apparatus 100 and the storage device 300.

Figure 3:
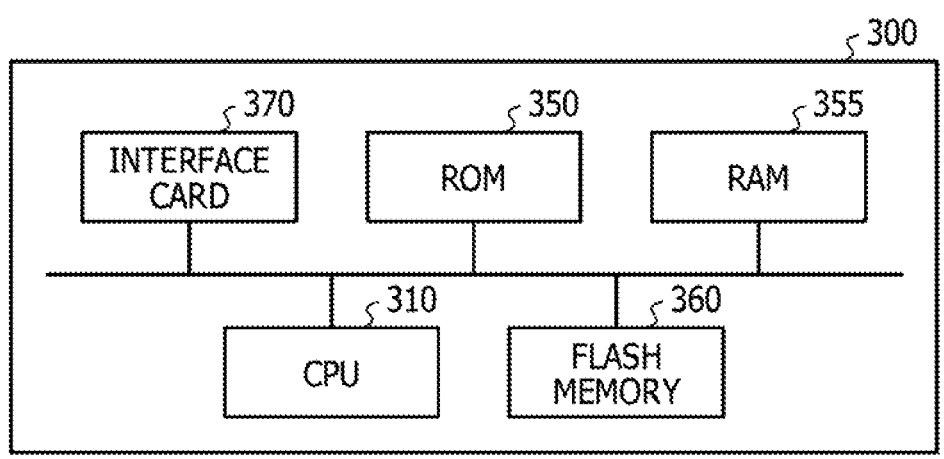
FIG. 3 is a diagram illustrating the hardware of the storage device.

FIG. 3 is a diagram illustrating the hardware of the storage device 300. The storage device 300 includes a CPU 310, a ROM 350, a RAM 355, a flash memory 360, and an interface card 370. The CPU 310 performs predetermined data processing by loading a computer program stored in the ROM 350 to the RAM 355 and executing it. For example, the CPU 310 executes garbage collection on the flash memory 360 when the free space in the flash memory 360 is reduced to a predetermined value or below. The CPU 310 is an example of a hardware processor. An MCU, an MPU, a DSP, an FPGA, or the like may be used instead of the CPU 310.

The ROM 350 stores the computer program to be executed by the CPU 310 and the like. The ROM 350 is an example of a non-volatile memory device, and a mask ROM, a PROM, a flash memory, an MRAM, a ReRAM, a FeRAM, or the like may be used. The RAM 355 is configured such that the computer program stored in the ROM 350 is loaded thereto. Also, the RAM 355 holds data to be processed by the CPU 310. The RAM 355 is an example of a volatile memory device, and an SRAM, a DRAM, or the like may be used.

The flash memory 360 is a data storage unit. The flash memory 360 stores data transmitted from the storage control apparatus 200. The flash memory 360 is, for example, a NAND-type flash memory. The flash memory 360 may include a plurality of flash memory chips. The interface card 370 functions as an interface to the storage control apparatus 200.

Figure 4A:
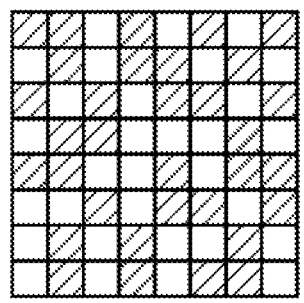
FIG. 4A is a diagram for explaining garbage collection to be executed in the storage device.
Figure 4B:
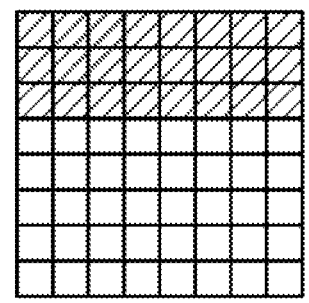
FIG. 4B is a diagram for explaining the garbage collection to be executed in the storage device.

FIGS. 4A and 4B are diagrams for explaining garbage collection executed on the flash memory 360 in the storage device 300. The flash memory 360 includes a plurality of blocks as data storage areas, and each block includes a plurality of pages. 1 block includes, for example, 64 pages. Also, the data capacity of each page is, for example, 16 K bytes. In the flash memory 360, data write and data read are performed on a page basis. Also, in the flash memory 360, after data is stored in an area, that area is not overwritable with other data. For this reason, updating the data in the area involves erasing the data already stored in the area and then storing the updated data in the area. Note that the data erasure is performed on a block basis (a block includes a plurality of pages).

There are cases where the addresses of pieces of data stored in the flash memory 360 are not continuous, that is, the pieces of data are stored at random addresses. In such cases, data storage areas are not used effectively, which sometimes results in areas in which data is not allowed to be stored although no data is stored therein. Also, there are cases where data has been stored in the flash memory 360 and remaining in the flash memory 360 although it has already been unrequested data. Such unrequested data reduces the free space for storing new data. To solve this, garbage collection is executed which erases the unrequested data and organizes the storage locations of pieces of data which are stored scatteredly.

FIG. 4A illustrates the state of data storage areas in the flash memory 360 before garbage collection, whereas FIG. 4B illustrates the state of the data storage areas in the flash memory 360 after the garbage collection. Note that in FIGS. 4A and 4B, each of the plurality of areas arranged in a matrix is a block, and the dark areas represent blocks storing data whereas the white areas represent blocks storing no data. By executing the garbage collection, the free space may be increased and pieces of data which are stored scatteredly may be rearranged.

Now, using a comparative example for an embodiment, description will be given of a problem that arises when the storage control apparatus 200 instructs the storage device 300 to store data while garbage collection is being executed in the storage device 300.

FIG. 5 is a schematic diagram of processes for data storage and garbage collection in the comparative example. In process S500, the information processing apparatus 100 requests the storage control apparatus 200 to set a logical volume. The logical volume refers to data storage areas logically set in the storage device 300, and represents here areas kept for the information processing apparatus 100 to store data. In process S501, the storage control apparatus 200 sets a logical volume in the storage device 300 based on the request from the information processing apparatus 100. Also, in process S502, the storage control apparatus 200 performs an initialization process on the logical volume thus set. Specifically, the storage control apparatus 200 performs a data erasure process on all the blocks included in the set logical volume. In process S503, the storage control apparatus 200 issues a notification regarding the set logical volume to the information processing apparatus 100. In process S504, the information processing apparatus 100 transmits a data write command and data to be written to the storage control apparatus 200. The storage control apparatus 200 receives the data write command and the data and, in process S505, transmits the data to the storage device 300 and instructs the storage device 300 to store the data. In process S506, the storage device 300 stores the data in the flash memory 360. In process S507, the storage device 300 transmits a completion notification indicating that the storage of the data has been completed to the storage control apparatus 200. In process S508, the storage control apparatus 200 notifies the information processing apparatus 100 that the completion notification has been received from the storage device 300.

Meanwhile, the storage device 300 counts the free space in the flash memory 360 after storing the data in the flash memory 360 in process S506. Then, in process S509, the storage device 300 determines whether or not the free space thus counted has reached or fallen below a threshold defined by the storage device 300. If detecting in process S509 that the counted free space has reached or fallen below the threshold, the storage device 300 executes garbage collection in process S510 to increase the free space. Now, assume that the information processing apparatus 100 transmits data and a data write command to the storage control apparatus 200 in process S511. Then, in process S512, the storage control apparatus 200 transmits the data to the storage device 300 and instructs the storage device 300 to store the data. Assume that, in this state, the garbage collection is being executed on the storage device 300. In this case, the data is not allowed to be stored in the flash memory 360, on which the garbage collection is being executed, and therefore this storage instruction waits until the garbage collection is finished. After the garbage collection is finished, the storage device 300 stores the data in the flash memory 360 in process S513. Further, in process S514, the storage device 300 transmits a completion notification indicating the storage of the data has been completed to the storage control apparatus 200. Then, in process S515, the storage control apparatus 200 notifies the information processing apparatus 100 that the completion notification has been received.

As described above, in the case where the information processing apparatus 100 transmits a data write command while garbage collection is being executed in the storage device 300, the storage of the data for the data write command is delayed, thereby lowering the response speed to the data write command.

Figure 6A:
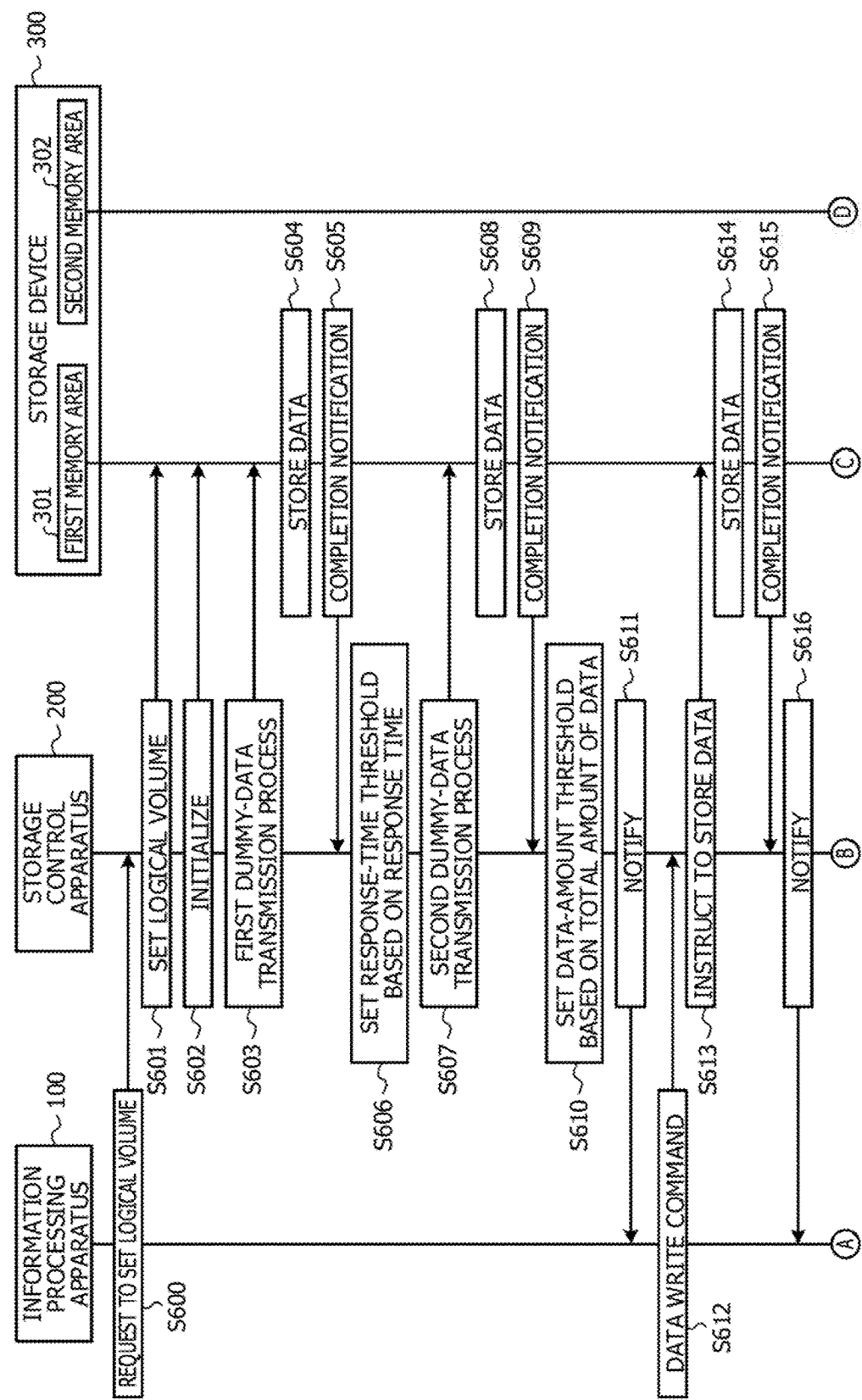
FIG. 6A is a schematic diagram of processes for data storage and garbage collection in an embodiment.
Figure 6B:
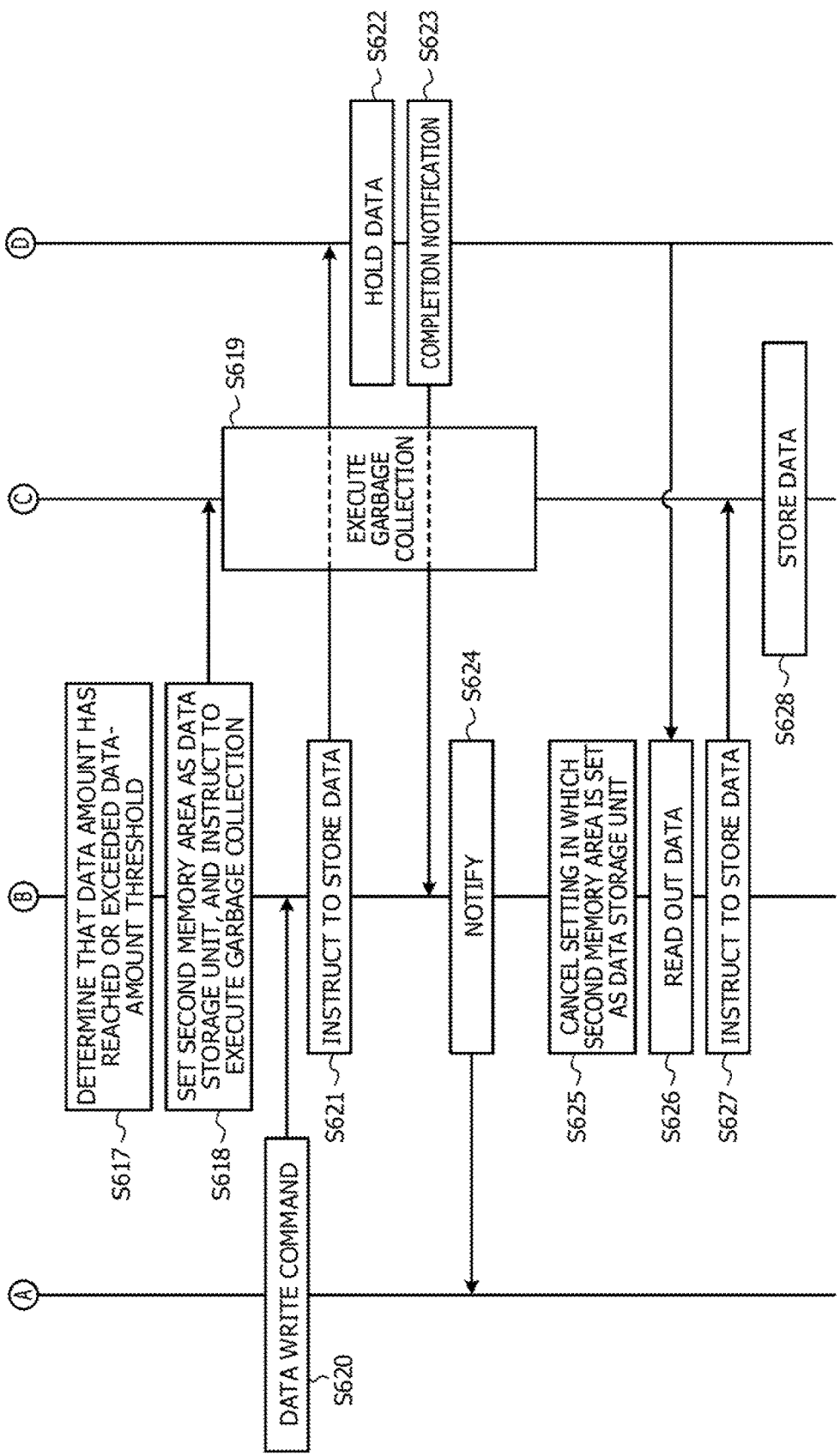
FIG. 6B is a schematic diagram of the processes for data storage and garbage collection in the embodiment.

FIGS. 6A and 6B are schematic diagrams of processes for data storage and garbage collection in the embodiment. In FIG. 6A, the storage device 300 includes a first memory area 301 and a second memory area 302. Both of the first memory area 301 and the second memory area 302 are part of the flash memory 360. In process S600, the information processing apparatus 100 requests the storage control apparatus 200 to set a logical volume. In process S601, the storage control apparatus 200 sets a logical volume in the first memory area 301 of the storage device 300 based on the request from the information processing apparatus 100. Also, in process S602, the storage control apparatus 200 performs an initialization process on the logical volume thus set. Specifically, the storage control apparatus 200 performs a data erasure process on all the blocks included in the set logical volume.

Thereafter, in process S603, the storage control apparatus 200 performs a first dummy-data transmission process on the set logical volume. In this first dummy-data transmission process, the storage control apparatus 200 transmits dummy data to the storage device 300 and instructs the storage device 300 to store the dummy data. In process S604, the storage device 300 stores the dummy data in the first memory area 301. Then, in process S605, the storage device 300 transmits a completion notification to the storage control apparatus 200. In process S606, the storage control apparatus 200 measures the response time from the instruction of the storage device 300 to store the dummy data to the reception of the completion notification from the storage device 300, and sets a response-time threshold based on the response time thus measured. The response-time threshold is set to a value obtained by multiplying the measured response time by a value greater than 1, for example, 1.5.

Now, the technical purpose of the response-time threshold thus set will be described. In process S602, before the first dummy-data transmission process is performed in process S603, the logical volume is initialized, that is, data erasure is performed on all the blocks included in the set logical volume. This leads to an assumption that, at the point when the first dummy-data transmission process is performed on the storage device 300, a sufficient free space is still available in the first memory area 301 and therefore storing the dummy data does not trigger execution of garbage collection in the storage device 300. Then, the time from when the storage control apparatus 200 issues the instruction to store the dummy data to when the storage control apparatus 200 receives the completion notification indicating that the storage of the dummy data has been completed (response time)

may be considered a response time without delay in the data storage processing due to garbage collection. In the case where a data storage instruction is issued while garbage collection is being executed, the response time is usually considered to be at least 1.5 times longer, for example, about 8 times longer than the response time without garbage collection being executed. Thus, in process S606, the storage control apparatus 200 sets a response time which is, for example, 1.5 times longer than the response time measured in the first dummy-data transmission process as the response-time threshold. In other words, the response-time threshold represents a predicted response time that would be taken if garbage collection were being executed in the storage device 300. Note that although FIG. 6A illustrates that process S603 to process S605 are executed only once, these processes may be executed a plurality of times. In that case, in process S606, the storage control apparatus 200 may set the response-time threshold based on the values of a plurality of response times obtained by performing the first dummy-data transmission process a plurality of times. For example, a value obtained by multiplying the average of the values of the plurality of response times by 1.5 may be set as the response-time threshold. Alternatively, a value obtained by multiplying the longest response time among the plurality of response times by 1.5 may be set as the response-time threshold.

Thereafter, in process S607, the storage control apparatus 200 performs a second dummy-data transmission process. In this second dummy-data transmission process, too, the storage control apparatus 200 transmits dummy data to the storage device 300 and instructs the storage device 300 to store the dummy data. In process S608, the storage device 300 stores the dummy data in the first memory area 301. In process S609, the storage device 300 transmits a completion notification to the storage control apparatus 200. The storage control apparatus 200 measures the response time in the second dummy-data transmission process and determines whether or not the response time thus measured reaches or exceeds the response-time threshold, which has been set in process S606. If the measured response time does not reach or exceed the response-time threshold, the second dummy-data transmission process is iterated. In the second dummy-data transmission process iterated, discontinuous logical addresses are preferably set as the logical addresses for the pieces of dummy data. For example, in the case where the data capacity of each single page in the flash memory 360 is 16 K bytes, the data amount of a piece of dummy data is set to 1 K byte, and the dummy-data transmission process is executed a plurality of times with the logical address shifted by 16 K bytes. In this way, it is possible to efficiently reduce the free space in the flash memory 360 while keeping low the amount of dummy data transmitted to the storage device 300.

When the response time measured in the second dummy-data transmission process reaches or exceeds the response-time threshold, it is assumed that an instruction to store dummy data has been issued during execution of garbage collection in the storage device 300. Then, in process S610, the storage control apparatus 200 calculates the total amount of dummy data transmitted to the storage device 300 in the second dummy-data transmission process, and sets a value obtained by multiplying the total amount of dummy data thus calculated by a value greater than 0 but less than 1, for example, 0.8 as a data-amount threshold.

Now, the technical purpose of the data-amount threshold will be described. The total amount of dummy data transmitted to the storage device 300 in the second dummy-data transmission process, which is calculated in process S610, represents "the total amount of pieces of data with random logical addresses stored in the first memory area 301 and a data amount that causes the storage device 300 to start executing garbage collection". Then, it is possible to predict that the storage device 300 will execute garbage collection when pieces of data with random logical addresses are transmitted to the storage device 300 in the calculated total amount of dummy data. The data-amount threshold is set to a value obtained by multiplying this total amount of data by a value greater than 0 but less than 1, for example, 0.8. In other words, this represents that the storage device 300 is likely to soon execute garbage collection if the data transmitted to the storage device 300 reaches the data-amount threshold.

In process S611, the storage control apparatus 200 issues a notification regarding the spared logical volume to the information processing apparatus 100. In process S612, the information processing apparatus 100 transmits a data write command and data to be written to the storage control apparatus 200. In process S613, after receiving the data write command and the data, the storage control apparatus 200 transmits the data to the storage device 300 and instructs the storage device 300 to store the data. In process S614, the storage device 300 stores the data in the first memory area 301. In process S615, the storage device 300 transmits a completion notification indicating that the storage of the data has been completed to the storage control apparatus 200. In process S616, the storage control apparatus 200 notifies the information processing apparatus 100 that the completion notification has been received.

The procedure of the process proceeds to the processing illustrated in FIG. 6B. The storage control apparatus 200 calculates the total amount of pieces of data with random logical addresses among the data transmitted to the storage device 300, and determines in process S617 whether or not the total amount of pieces of data has reached or exceeded the data-amount threshold, which has been set in process S610. If determining in process S617 that the total amount of pieces of data with random logical addresses has reached or exceeded the data-amount threshold, the storage control apparatus 200 sets the second memory area 302 as the data storage unit instead of the first memory area 301 in process S618. Then, in process S618, the storage control apparatus 200 instructs the storage device 300 to execute garbage collection. In process S619, the storage device 300 executes garbage collection on the first memory area 301. As described above, in this embodiment, the storage device 300 is instructed to execute garbage collection at the point when the total amount of data transmitted to the storage device 300 reaches or exceeds the data-amount threshold. In this way, the storage control apparatus 200 may instruct the storage device 300 to execute garbage collection at a timing before the storage device 300 would voluntarily execute garbage collection based on the free space in the first memory area 301. In other words, the timing to execute garbage collection may be controlled on the storage control apparatus 200 side. Also, in this embodiment, when instructing the storage device 300 to execute garbage collection, the storage control apparatus 200 sets the second memory area 302, which is a memory area other than the area to be subjected to the garbage collection or the first memory area 301, as the data storage unit. Thus, the timing to execute garbage collection is controlled on the storage control apparatus 200 side and, when a data write command is received at this execution timing from the information processing apparatus 100, the data is temporarily held in the second memory area 302. Increase in the response time to a data write command may be suppressed.

Returning to the description with FIG. 6B, in process S620, the information processing apparatus 100 transmits data and a data write command to the storage control apparatus 200. In process S621, the storage control apparatus 200 instructs the storage device 300 to store the data. Here, in process S621, the storage control apparatus 200 stores the logical addresses of the data transmitted to the storage device 300. In process S622, the storage device 300 temporarily holds the data not in the first memory area 301 but in the second memory area 302, which has been set as the data storage unit in process S618. Hence, the garbage collection of the first memory area 301 and the data saving to the second memory area 302 are executed in parallel in time. When the data saving to the second memory area 302 is completed, the storage device 300 transmits a completion notification for the data saving to the storage control apparatus 200 in process S623. In process S624, the storage control apparatus 200 notifies the information processing apparatus 100 that the completion notification has been received. In this way, even if the information processing apparatus 100 transmits a data write command while garbage collection is being executed, increase in the response time to the data write command is suppressed. When the execution of the garbage collection in process S619 is finished, the storage control apparatus 200 cancels the setting in which the second memory area 302 is set as the data storage unit in process S625. Consequently, the first memory area 301 is set as the data storage unit again. Then, in process S626, the storage control apparatus 200 reads out the data held in the second memory area 302 based on the logical addresses stored in process S621. The data thus read out is held in, for example, the RAM 255 of the storage control apparatus 200. In process S627, the storage control apparatus 200 transmits the data held in the RAM 255 to the storage device 300 and instructs the storage device 300 to store the data. Since the first memory area 301 is now set as the data storage unit, the storage device 300 stores the data in the first memory area 301 in process S628.

As described with FIGS. 6A and 6B, in this embodiment, the storage control apparatus 200 instructs the storage device 300 to execute garbage collection at a timing before the storage device 300 would voluntarily execute garbage collection. Hence, the timing to execute garbage collection may be determined by the storage control apparatus 200. Also, the storage control apparatus 200 sets the second memory area 302 as an alternative data storage unit while garbage collection is being executed on the first memory area 301. Hence, increase in the response time to a data write command may be suppressed even while garbage collection is being executed. Also, the storage control apparatus 200 calculates the data-amount threshold by performing the first dummy-data transmission process and the second dummy-data transmission process after the logical volume to be used by the information processing apparatus 100 is set. Using this data-amount threshold allows the storage control apparatus 200 to identify a timing to execute garbage collection before the storage device 300 would voluntarily execute garbage collection, based on the total amount of data transmitted to the storage device 300.

Meanwhile, with FIGS. 6A and 6B, the description has been given of the example where a data-amount threshold is set in response to a request to set a logical volume from the information processing apparatus 100 to the storage control apparatus 200. The data-amount threshold is assumed to be defined based on the data capacity of the logical volume to be set. Then, in a modification, information defining relations between logical-volume capacities and data-amount thresholds may be prepared in advance and, when the information processing apparatus 100 issues a request to set a logical volume, a data-amount threshold may be set based on the capacity of that logical volume and the above information.

Also, with FIGS. 6A and 6B, the description has been given of the example where the second memory area 302 is a part of the flash memory 360, like the first memory area 301. In a modification, a memory other than the flash memory 360, for example, at least a part of the RAM 355 of the storage device 300 may be utilized as the second memory area 302. In the case where the storage control apparatus 200 controls a plurality of storage devices 300, the second memory area 302 may be provided as a memory area common to the plurality of storage devices 300.

Note that, in FIGS. 6A and 6B, the storage control apparatus 200 sets the response-time threshold and the data-amount threshold by transmitting dummy data to the storage device 300. However, the response-time threshold and the data-amount threshold may be set using different data. For example, the response-time threshold and the data-amount threshold may be set using the data to be written transmitted from the information processing apparatus 100 to the storage control apparatus 200. Specifically, first, the information processing apparatus 100 requests the storage control apparatus 200 to set a logical volume. The storage control apparatus 200 sets a logical volume and issues a notification to the information processing apparatus 100. Then, the information processing apparatus 100 transmits a data write command and data to be written to the storage control apparatus 200. The storage control apparatus 200 instructs the storage device 300 to store the data and measures the response time. Based on the response time thus measured, the storage control apparatus 200 sets a response-time threshold. Also, the storage control apparatus 200 calculates a total data amount by adding the data amounts of pieces of data with random logical addresses one after another among data transmitted from the information processing apparatus 100 to the storage device 300. Then, the storage control apparatus 200 sets a data-amount threshold based on the total data amount at a point when the response time exceeds to the response-time threshold. After the data-amount threshold is set, the storage control apparatus 200 determines whether or not the total data amount of pieces of data with random logical addresses among data transmitted to the storage device 300 has reached or exceeded the data-amount threshold, as in process S617. If determining that the total data amount has reached or exceeded the data-amount threshold, the storage control apparatus 200 instructs the storage device 300 to execute garbage collection, as in process S618. With such processing, this embodiment may be carried out without using dummy data.

Figure 7:
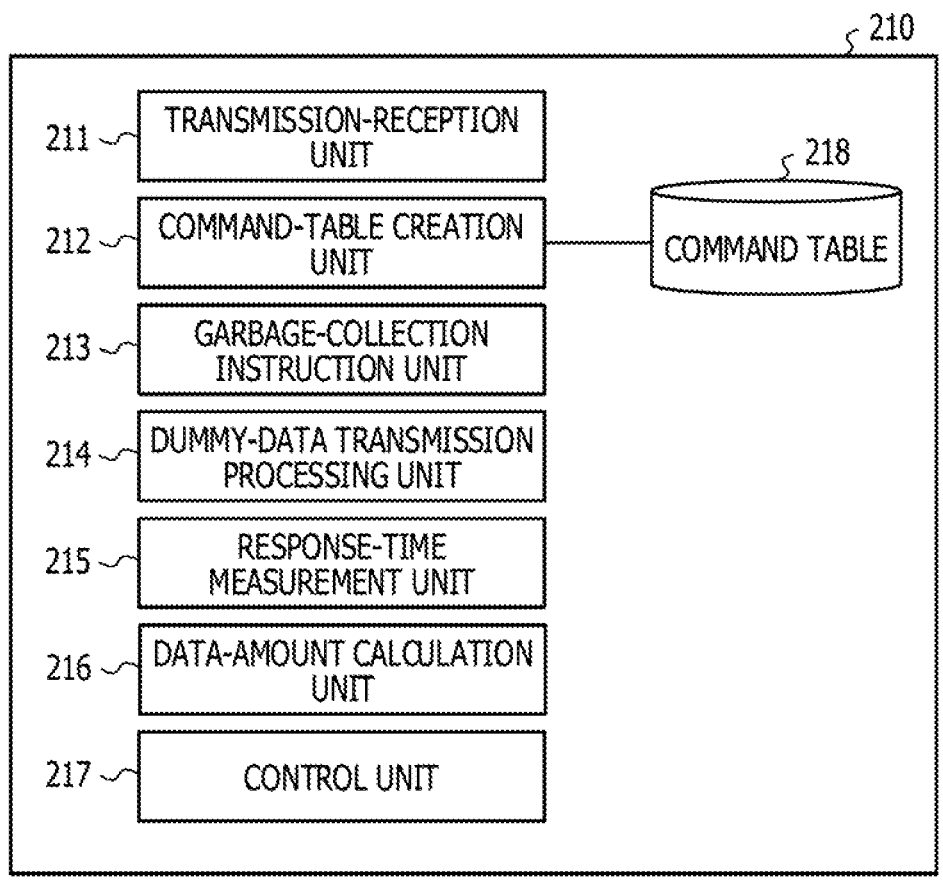
FIG. 7 is a functional block diagram of a CPU in the embodiment.

FIG. 7 is a functional block diagram of the CPU 210 in the embodiment. By, for example, executing a computer program loaded from the ROM 250 to the RAM 255, the CPU 210 functions as a transmission-reception unit 211, a command-table creation unit 212, a garbage-collection instruction unit 213, a dummy-data transmission processing unit 214, a response-time measurement unit 215, a data-amount calculation unit 216, and a control unit 217. Further, the CPU 210 holds a command table 218. The command table 218 may be held outside the CPU 210, for example, in the ROM 250 or the RAM 255.

The transmission-reception unit 211 receives commands and data transmitted from the information processing apparatus 100 and completion notifications transmitted from the storage device 300 and transmits data addressed to the storage device 300 and notification signals addressed to the information processing apparatus 100. The command-table creation unit 212 creates the command table 218. The method of creating the command table 218 will be described later. The garbage-collection instruction unit 213 instructs the storage device 300 to execute garbage collection. The dummy-data transmission processing unit 214 executes the first dummy-data transmission process and the second dummy-data transmission process. The response-time measurement unit 215 measures the response time in the first dummy-data transmission process and in the second dummy-data transmission process. Further, the data-amount calculation unit 216 calculates the total amount of pieces of data with random logical addresses among data transmitted to the storage device 300 in the second dummy-data transmission process. The control unit 217 controls the storage device 300 such that, for example, the second memory area 302 is utilized as the data storage unit instead of the first memory area 301 while the garbage-collection instruction unit 213 instructs the storage device 300 to execute garbage collection. The command table 218 is a table created by the command-table creation unit 212, and details will be described later.

Figure 8:
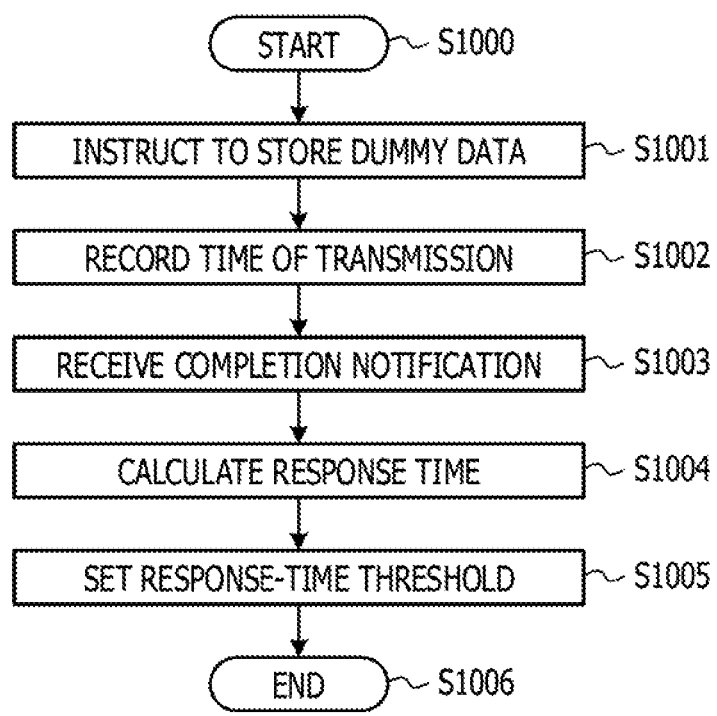
FIG. 8 is a flowchart of a process for first dummy-data transmission to be executed by the CPU in the embodiment.

FIG. 8 is a flowchart of a process for first dummy-data transmission to be executed by the CPU 210 in the embodiment. The procedure of the process illustrated in FIG. 8 starts in process S1000. In process S1001, the dummy-data transmission processing unit 214 transmits dummy data to the storage device 300 and instructs the storage device 300 to store the dummy data. In process S1002, the response-time measurement unit 215 records the time of the transmission of the dummy data to the storage device 300. Then, in process S1003, the transmission-reception unit 211 receives a completion notification from the storage device 300 indicating that the storage of the dummy data has been completed. In process S1004, the response-time measurement unit 215 calculates a response time based on the difference between the time of the reception of the completion notification and the time of the transmission of the dummy data to the storage device 300. In process S1005, the response-time measurement unit 215 sets a response-time threshold based on the response time thus calculated. For example, a value obtained by multiplying the response time by 1.5 is set as the response-time threshold. After process S1005, the procedure of the process ends in process S1006.

Figure 9:
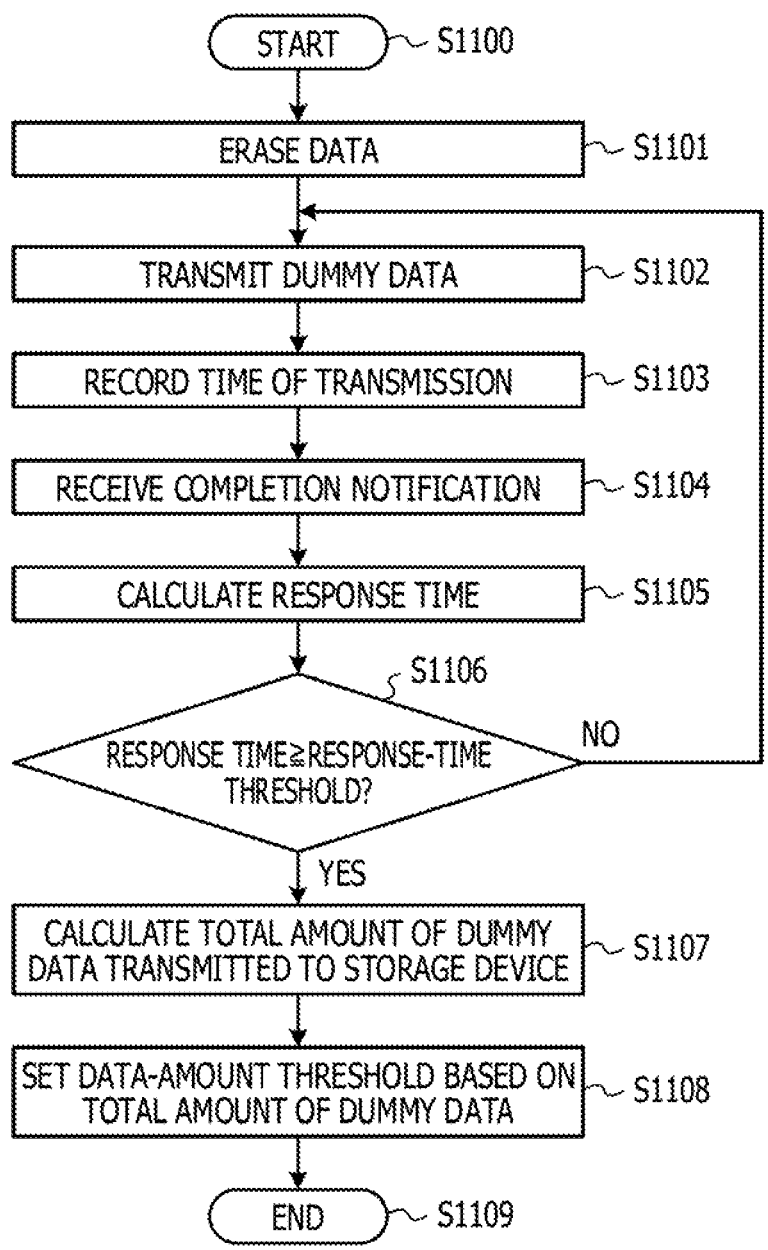
FIG. 9 is a flowchart of a process for second dummy-data transmission to be executed by the CPU in the embodiment.

FIG. 9 is a flowchart of a process for second dummy-data transmission executed by the CPU 210 in the embodiment. The procedure of the process illustrated in FIG. 9 starts in process S1100. In process S1101, the control unit 217 erases the dummy data stored in the first memory area 301 in the first dummy-data transmission process. In process S1102, the dummy-data transmission processing unit 214 transmits dummy data to the storage device 300. In process S1103, the response-time measurement unit 215 records the time of the transmission of when the dummy data to the storage device 300. In process S1104, the transmission-reception unit 211 receives a completion notification from the storage device 300 indicating that the storage of the dummy data has been completed. In process S1105, the response-time measurement unit 215 calculates a response time based on the difference between the time of the reception of the completion notification and the time of the transmission of the dummy data. In process S1106, the dummy-data transmission processing unit 214 compares the response time thus calculated with the response-time threshold, which has been set based on the first dummy-data transmission process, and determines whether or not the calculated response time reaches or exceeds the response-time threshold. The procedure of the process returns to process S1102 if it is not determined that the calculated response time reaches or exceeds the response-time threshold, whereas the procedure of the process proceeds to process S1107 if it is determined that the calculated response time reaches or exceeds the response-time threshold. In process S1107, the data-amount calculation unit 216 calculates the total amount of dummy data transmitted to the storage device 300. Then, in process S1108, the data-amount calculation unit 216 sets a data-amount threshold based on the total amount of data thus calculated. For example, a value obtained by multiplying the total amount of dummy data by 0.8 is set as the data-amount threshold. Then, the procedure of the process ends in process S1109.

FIG. 10 is an example of the command table 218 in the embodiment. The command table 218 is a table created by the command table creation unit 212 of the storage control apparatus 200, and "received-command number", "data-write-command flag", "logical address", "data amount", and "random flag" are registered for each command.

The "received-command number" is a receipt number of a command transmitted from the information processing apparatus 100 and received by the storage control apparatus 200, and is information given by the command table creation unit 212. The "data-write-command flag" is information indicating whether or not the type of the received command is a data write command. The command type is information included in the received command, and extracted from the command by the command-table creation unit 212. "1" is registered as the data-write-command flag when the command type is data write. The command types other than data write include data read, data erasure, and the like. In the example illustrated in FIG. 10, the data-write-command flag for the command with the received-command number "2" (hereinafter referred to as the second command) is "0". This represents that the second command is a command other than a data write command, for example, a data read command. The "logical address" is a logical address for data identified by the information processing apparatus 100. In the case of, for example, a data write command, the beginning address for the data is the logical address. The logical address is information included in the received command and is extracted from the command by the command-table creation unit 212. In the case of, for example, a data write command, the "data amount" is information identified by the byte count of the data to be written. The data amount is information included in the received command and is extracted from the command by the command-table creation unit 212.

The "random flag" is information indicating whether or not the logical address in a data write command is a logical address sequential relative to the logical address in the immediately previous data write command. "0" is registered as the random flag if the logical addresses in the two close data write commands are sequential relative to each other, whereas "1" is registered as the random flag if the logical addresses in the two close data write commands are not sequential but are random relative to each other. In the example of FIG. 10, the data-write-command flag for the command with the received-command number "1" (hereinafter referred to as the first command) is "1", and the next command with a data-write-command flag "1" is the command with the received-command number "3" (hereinafter referred to as the third command). In this case, the command-table creation unit 212 determines whether or not a value of obtained by adding the data amount in the first command to the logical address in the first command coincides with the logical address in the third command. A value obtained by adding the data amount in the first command "0x400" to the logical address in the first command "0x0000_0000" does not coincide with the logical address in the third command "0x0001_B000". This indicates that the third command is not a data write command having a logical address sequential relative to the logical address in the first command. Consequently, "1" is registered as the random flag for the third command. Similarly, the command-table creation unit 212 determines whether the logical address in the third command and the logical address in the data write command received following the third command are sequential or random relative to each other. The command received following the third command and given a data-write-command flag "1" is the command with the received-command number "4" (hereinafter referred to as the fourth command). A value obtained by adding the data amount in the third command "0x100" to the logical address in the third command "0x0001_B000" coincides with the logical address in the fourth address "0x0001_B100". This indicates that the fourth command is a data write command having a logical address sequential relative to the logical address in the third command. Consequently, "0" is registered under the item of random flag for the fourth command.

Figure 11:
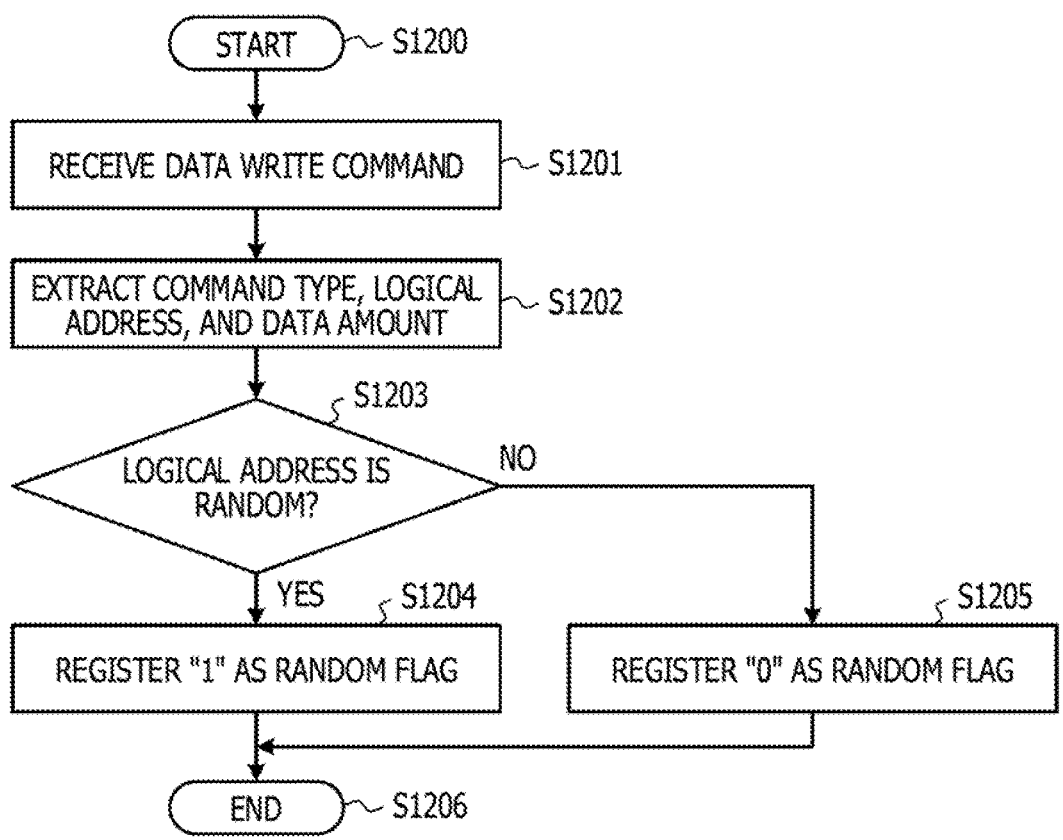
FIG. 11 is a flowchart of a process mainly for creation of the command table among processes to be executed by the CPU in the embodiment.

FIG. 11 is a flowchart of a process mainly for creation of the command table 218 among the processes to be executed by the CPU 210 in the embodiment. The procedure of the process illustrated in FIG. 11 starts in process S1200. In process S1201, the transmission-reception unit 211 receives a data write command from the information processing apparatus 100. In process S1202, the command-table creation unit 212 extracts the pieces of information on the command type, the logical address, and the data amount among the pieces of information included in the received command. In process S1203, the command-table creation unit 212 determines whether or not the data write command has a logical address that is random relative to the logical address in the immediately previous data write command. If determining that the logical address in the data write command is random relative to the logical address in the immediately previous data write command, the command-table creation unit 212 registers a random flag "1" in the command table 218 in process S1204. If not determining that the logical address in the data write command is random relative to the logical address in the immediately previous data write command, the command-table creation unit 212 registers a random flag "0" in the command table 218 in process S1205. Then, in process S1206, the procedure of the process ends.

FIG. 12 is a flowchart of a process mainly for instruction for garbage collection among the processes to be executed by the CPU 210 in the embodiment. The procedure of the process illustrated in FIG. 12 starts in process S1300. In process S1301, the garbage-collection instruction unit 213 refers to the command table 218 and determines whether or not the random flag for the command of interest is "1". The procedure of the process proceeds to process S1302 if it is not determined that the random flag is "1", whereas the procedure of the process proceeds to process S1303 if it is determined that the random flag is "1". In process S1302, the garbage-collection instruction unit 213 increments the number of the command of interest (received-command number) by one, and the procedure of the process returns to process S1301. In process S1303, the garbage-collection instruction unit 213 cumulatively adds the data amount in the command. To "cumulatively add" represents to add the data amounts in a plurality of commands with a random flag "1" one after another in the case where a loop occurs in which the procedure of the process returns to process S1301 from process S1304 to be described below. In process S1304, the garbage-collection instruction unit 213 determines whether or not the total value of the data amounts calculated in process S1303 has reached or exceeded the data-amount threshold, which has been identified in process S1108 in FIG. 9. The procedure of the process proceeds to process S1302 if it is not determined that the total value of the data amounts has reached or exceeded the data-amount threshold, whereas the procedure of the process proceeds to process S1305 if it is determined that the total value of the data amounts has reached or exceeded the data-amount threshold. In process S1305, the control unit 217 sets the second memory area 302 of the storage device 300 as the data storage unit instead of the first memory area 301. In process S1306, the garbage-collection instruction unit 213 instructs the storage device 300 to execute garbage collection. In response to this instruction, the storage device 300 starts executing garbage collection on the first memory area 301. In process S1307, the control unit 217 determines whether or not the garbage collection on the first memory area 301 has been finished. If not determining that the garbage collection has been finished, the control unit 217 iterates process S1307. In this case, the control unit 217 may execute process S1307 every 100 ms, for example. If it is determined that the garbage collection on the first memory area 301 has been finished, the procedure of the process proceeds to process S1308. In process S1308, the control unit 217 cancels the setting in which the second memory area 302 is set as the data storage unit. Thus, if a data write command is received subsequently from the information processing apparatus 100, the data will be stored in the first memory area 301.

Meanwhile, during the period from the setting of the second memory area 302 as the data storage unit in process S1305 to the completion of the execution of the garbage collection, the transmission-reception unit 211 receives a data write command from the information processing apparatus 100 in process S1309. In process S1310, the control unit 217 instructs the storage device 300 to save the data. In this case, the storage device 300 saves the data to the second memory area 302 since the second memory area 302 is set as the data storage unit. This may avoid garbage collection processing and data storage processing competing with each other in the first memory area 301. Then, when the saving of the data to the second memory area 302 is completed, the storage device 300 transmits a completion notification to the storage control apparatus 200. In process S1311, the transmission-reception unit 211 receives the completion notification from the storage device 300. In process S1312, the control unit 217 notifies the information processing apparatus 100 that the completion notification has been received.

In process S1313, the control unit 217 reads out the data held in the second memory area 302. In process S1314, the control unit 217 instructs the storage device 300 to store the data thus read out in the first memory area 301. Then, the procedure of the process ends in process S1315.

With FIG. 12, the description has been given of the example where the storage control apparatus 200 instructs the storage device 300 to execute garbage collection by comparing the cumulatively added data amount with the data-amount threshold. In a modification, a value obtained by multiplying the cumulatively added data amount by an aging deterioration coefficient may be compared with the data-amount threshold. In consideration of the deterioration of the flash memory 360 in response speed with the length of usage, the storage control apparatus 200 may instruct the storage device 300 to execute garbage collection when the value obtained by multiplying the cumulatively added data amount by the aging deterioration coefficient, for example, 1.2 reaches or exceeds the data-amount threshold.

As described above, in this embodiment, the storage control apparatus 200 determines the timing to execute garbage collection and instructs the storage device 300 to execute garbage collection. Also, the timing to execute garbage collection is preferably set to be before the timing at which the storage device 300 would execute garbage collection itself based on decrease in the free space in the first memory area 301. In this way, the timing to execute garbage collection may be controlled by the storage control apparatus 200.

Also, the storage control apparatus 200 sets the second memory area 302 of the storage device 300 as a temporary data storage unit when instructing the storage device 300 to execute garbage collection on the first memory area 301. Thus, if a data write command is received from the information processing apparatus 100 while garbage collection is being executed on the first memory area 301, the data may be held in the second memory area 302 without waiting until the garbage collection on the first memory area 301 is finished. This enables suppression of decrease in the response speed to a data write command from the information processing apparatus 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage system comprising:
a storage device including a first memory area and a second memory area and configured to determine whether to execute garbage collection on the first memory area based on a free space in the first memory area; and
a storage control apparatus coupled to the storage device, the storage control apparatus including a memory and a processor coupled to the memory, wherein
the processor is configured to:
receive a first command requesting write of first data,
cause the storage device to store the first data in the first memory area based on the first command,
determine whether to cause the storage device to execute the garbage collection on the first memory area, based on a data amount of the first data,
transmit a first instruction that instructs the storage device to execute the garbage collection on the first memory area when the processor determines to cause the storage device to execute the garbage collection based on the data amount of the first data, and
cause the storage device to store second data in the second memory area when the garbage collection on the first memory area is being executed based on the first instruction and the processor receives a second command requesting write of the second data, so that the processor is configured to store the second data in the second memory area while the garbage collection is being executed on the first memory area.

2. The storage system according to claim 1, wherein the storage device is configured to execute the garbage collection on the first memory area in at least one of a case where the storage device receives the first instruction from the processor and a case where the free space in the first memory area is less than a first value.

3. The storage system according to claim 2, wherein the processor is configured to:
transmit a second instruction to store dummy data to the storage device before causing the storage device to store the first data,
set a second value based on a time from transmission of the second instruction to store the dummy data to reception of a completion notification indicating that a process of storing the dummy data has been completed, and on a data mount of the dummy data, and
transmit the first instruction to the storage device when the data amount of the first data is larger than the second value.

4. The storage system according to claim 3, wherein the second value is set such that the processor transmits the first instruction to the storage device to execute the garbage collection before the free space in the first memory area becomes less than the first value.

5. The storage system according to claim 3, wherein the second instruction includes a plurality of instructions, and
a plurality of logical addresses in the plurality of instructions for the dummy data are random addresses.

6. The storage system according to claim 1, wherein the first command includes a plurality of commands, and
when a plurality of logical addresses in the plurality of commands for the first data are random addresses, the processor is configured to determine whether to cause the storage device to execute the garbage collection, based on the data amount of the first data.

7. The storage system according to claim 6, wherein when a value obtained by adding a data amount of a first command of the plurality of commands to a first logical address of the first command does not coincide with a second logical address of a second command of the plurality of commands, the processor is configured to determine that the second logical address is random relative to the first logical address.

8. The storage system according to claim 1, wherein the storage device is configured to store the second data stored in the second memory area into the first memory area after the garbage collection on the first memory area is completed.

9. The storage system according to claim 1, wherein the storage device is a solid state drive (SSD).

10. The storage system according to claim 1, wherein the first memory area is a flash memory.

11. A storage control apparatus configured to control a storage device including a first memory area and a second memory area and configured to determine whether to execute garbage collection on the first memory area based on a free space in the first memory area, the storage control apparatus comprising:

a memory; and a processor coupled to the memory and configured to:
receive a first command requesting write of first data,
cause the storage device to store the first data in the first memory area based on the first command,
determine whether to cause the storage device to execute the garbage collection on the first memory area, based on a data amount of the first data,
transmit a first instruction that instructs the storage device to execute the garbage collection on the first memory area when the processor determines to cause the storage device to execute the garbage collection based on the data amount of the first data, and
cause the storage device to store second data in the second memory area when the garbage collection on the first memory area is being executed based on the first instruction and the processor receives a second command requesting write of the second data, so that the processor is configured to store the second data in the second memory area while the garbage collection is being executed on the first memory area.

12. The storage control apparatus according to claim 11, wherein
the storage device is configured to execute the garbage collection on the first memory area in at least one of a case where the storage device receives the first instruction from the processor and a case where the free space in the first memory area is less than a first value.

13. The storage control apparatus according to claim 12, wherein
the processor is configured to:
transmit a second instruction to store dummy data to the storage device before causing the storage device to store the first data,
set a second value based on a time from transmission of the second instruction to store the dummy data to reception of a completion notification indicating that a process of storing the dummy data has been completed, and on a data mount of the dummy data, and
transmit the first instruction to the storage device when the data amount of the first data is larger than the second value.

14. The storage control apparatus according to claim 13, wherein
the second value is set such that the processor transmits the first instruction to the storage device to execute the garbage collection before the free space in the first memory area becomes less than the first value.

15. The storage control apparatus according to claim 13, wherein
the second instruction includes a plurality of instructions, and
a plurality of logical addresses in the plurality of instructions for the dummy data are random addresses.

16. The storage control apparatus according to claim 11, wherein
the first command includes a plurality of commands, and
when a plurality of logical addresses in the plurality of commands for the first data are random addresses, the processor is configured to determine whether to cause the storage device to execute the garbage collection, based on the data amount of the first data.

17. The storage control apparatus according to claim 16, wherein
when a value obtained by adding a data amount of a first command of the plurality of commands to a first logical address of the first command does not coincide with a second logical address of a second command of the plurality of commands, the processor is configured to determine that the second logical address is random relative to the first logical address.

18. The storage control apparatus according to claim 11, wherein
the storage device is configured to store the second data stored in the second memory area into the first memory area after the garbage collection on the first memory area is completed.

19. A method of controlling a storage device executed by a storage control apparatus, the storage device including a first memory area and a second memory area and configured to determine whether to execute garbage collection on the first memory area based on a free space in the first memory area, the method comprising:
receiving a first command requesting write of first data;
causing the storage device to store the first data in the first memory area based on the first command,
determining whether to cause the storage device to execute the garbage collection on the first memory area, based on a data amount of the first data;
transmitting a first instruction that instructs the storage device to execute the garbage collection on the first memory area when the processor determines to cause the storage device to execute the garbage collection based on the data amount of the first data; and
causing the storage device to store second data in the second memory area when the garbage collection on the first memory area is being executed based on the first instruction and the processor receives a second command requesting write of the second data, so that the second data is stored in the second memory area while the garbage collection is being executed on the first memory area.

20. The method according to claim 19, wherein
the storage device executes the garbage collection on the first memory area in at least one of a case where the storage device receives the first instruction from the processor and a case where the free space in the first memory area is less than a first value.

* * * * *